United States Patent [19]

Nagashima et al.

[11] Patent Number: 5,581,613
[45] Date of Patent: Dec. 3, 1996

[54] COLOR IMAGE PROCESSING APPARATUS AND METHOD

[75] Inventors: Nao Nagashima; Yasumichi Suzuki, both of Yokohama; Mitsuru Kurita, Tokyo, all of Japan

[73] Assignee: Canon Kabushiki Kaisha, Tokyo, Japan

[21] Appl. No.: 270,306

[22] Filed: Jul. 5, 1994

Related U.S. Application Data

[63] Continuation of Ser. No. 996,789, Dec. 23, 1992, abandoned.

[30] Foreign Application Priority Data

Jan. 7, 1992 [JP] Japan .................................. 4-000829
Sep. 28, 1992 [JP] Japan .................................. 4-258201
Sep. 28, 1992 [JP] Japan .................................. 4-258204

[51] Int. Cl.$^6$ .................... G03G 21/00; H04N 1/44; H04N 7/167; H04L 9/00
[52] U.S. Cl. .................... 380/21; 355/201; 380/10; 380/18; 380/48
[58] Field of Search ............................ 380/10, 18, 20, 380/21, 48; 355/201

[56] References Cited

U.S. PATENT DOCUMENTS

| | | |
|---|---|---|
| 3,886,302 | 5/1975 | Kosco . |
| 4,390,898 | 6/1983 | Bond et al. . |
| 4,392,021 | 7/1983 | Slate . |
| 4,530,008 | 7/1985 | McVoy . |
| 4,817,144 | 3/1989 | Citta et al. ................. 380/20 |
| 4,829,569 | 5/1989 | Smith et al. ............... 380/10 |
| 4,864,613 | 9/1989 | Van Cleave ................ 380/10 |
| 4,916,737 | 4/1990 | Chomet et al. ............ 380/20 |
| 5,062,136 | 10/1991 | Gattis et al. ............... 380/18 |
| 5,091,938 | 2/1992 | Thompson et al. ......... 380/21 |
| 5,166,977 | 11/1992 | Ross ........................... 380/18 |

FOREIGN PATENT DOCUMENTS

| | | |
|---|---|---|
| 3633999 | 4/1987 | Germany . |
| 4021061 | 1/1992 | Germany . |
| 4021783 | 1/1992 | Germany . |

*Primary Examiner*—Stephen C. Buczinski
*Attorney, Agent, or Firm*—Fitzpatrick, Cella, Harper & Scinto

[57] ABSTRACT

An image processing system has an external image processing apparatus and an image input/output apparatus. One of the apparatuses acts as a transmission-side apparatus and the other apparatus acts as a reception-side apparatus. The transmission-side apparatus transmits image data and includes a reception device for receiving an encryption instruction from an apparatus which receives image data, and an output device for encrypting the image data on the basis of the encryption instruction and outputting the encrypted data to the apparatus at a reception side. The reception-side apparatus receives image data and includes a transmitting device for transmitting the encryption instruction, and a decrypting device for decrypting the encrypted data on the basis of the encryption instruction.

23 Claims, 18 Drawing Sheets

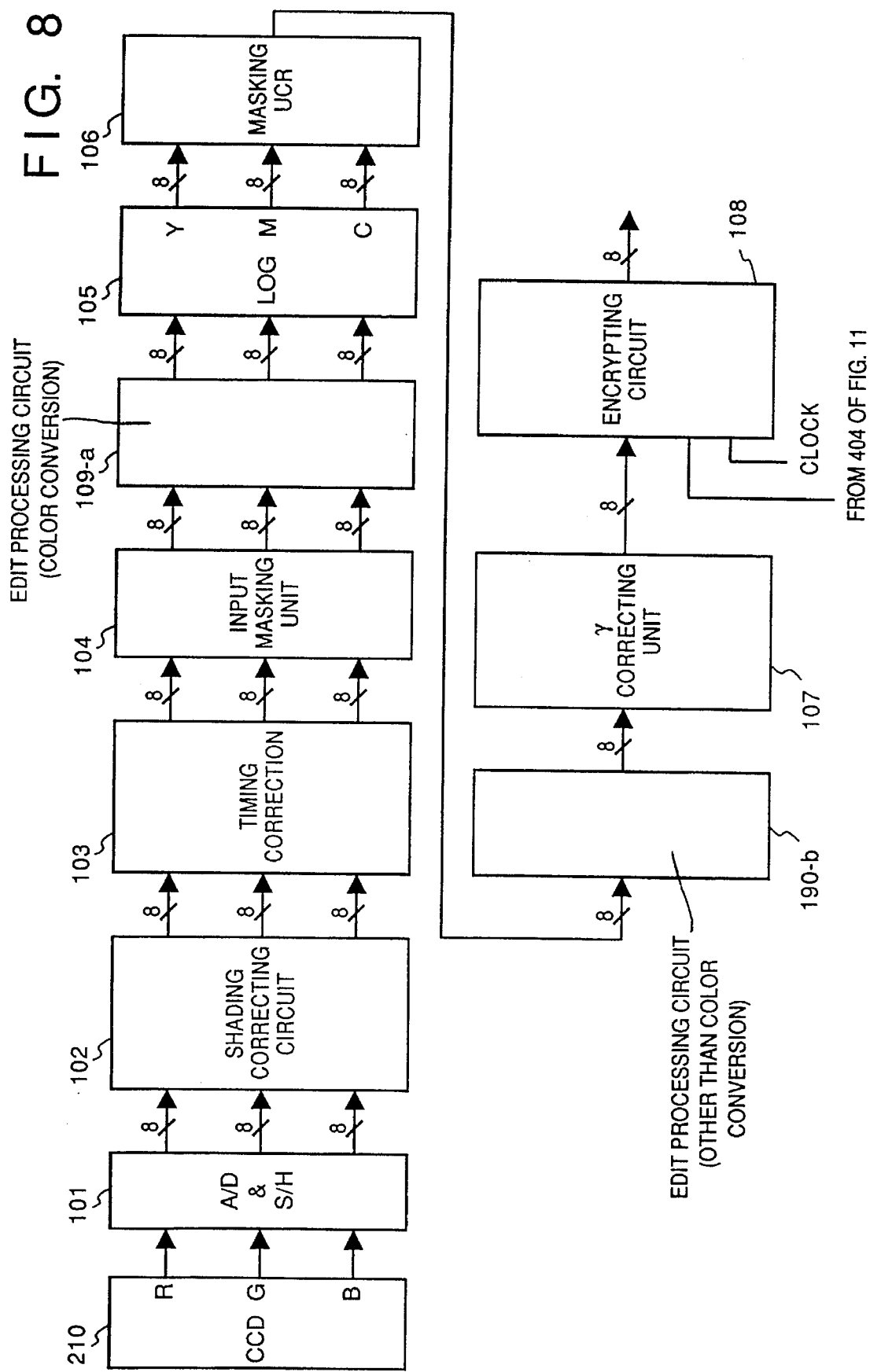

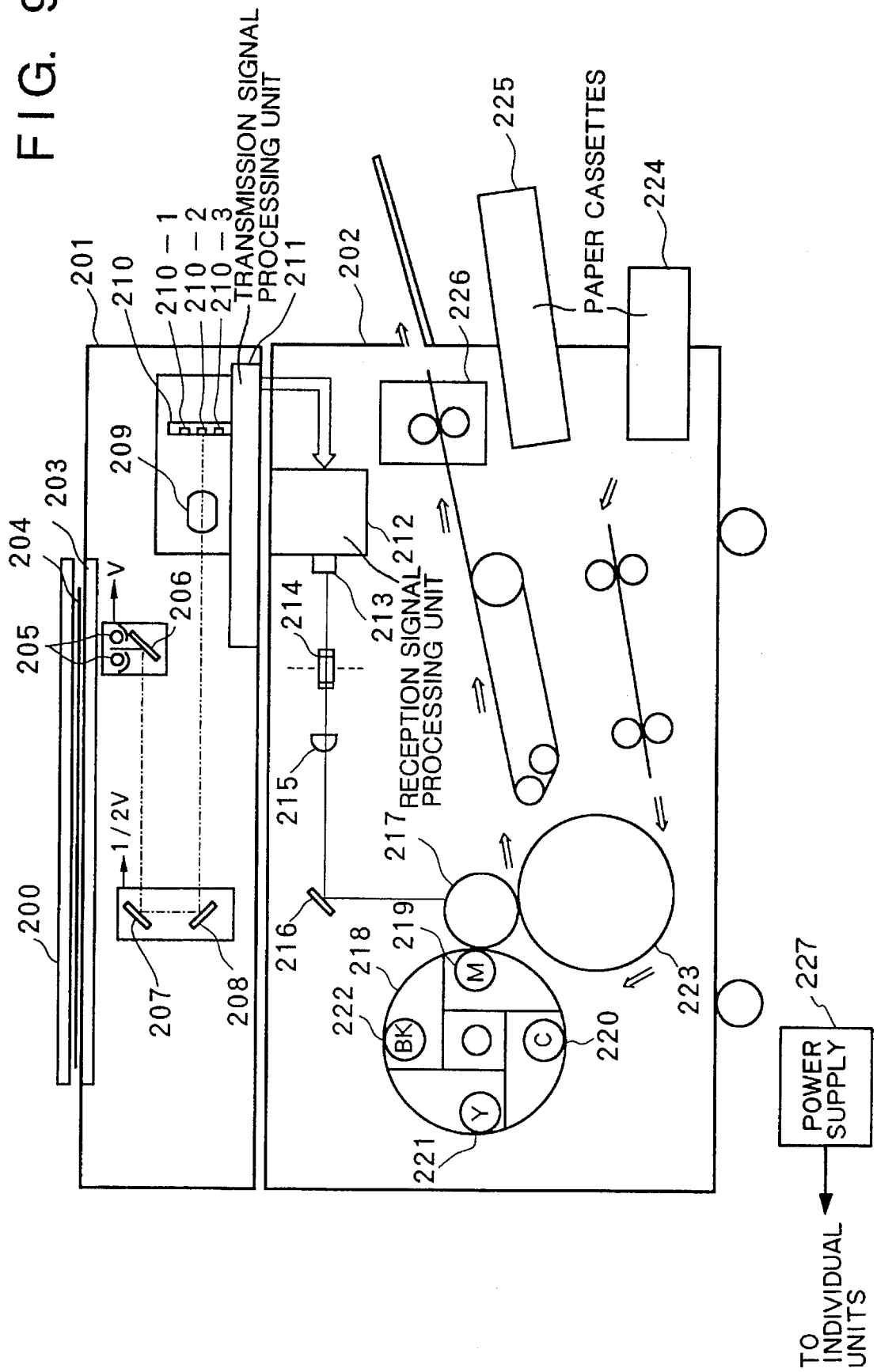

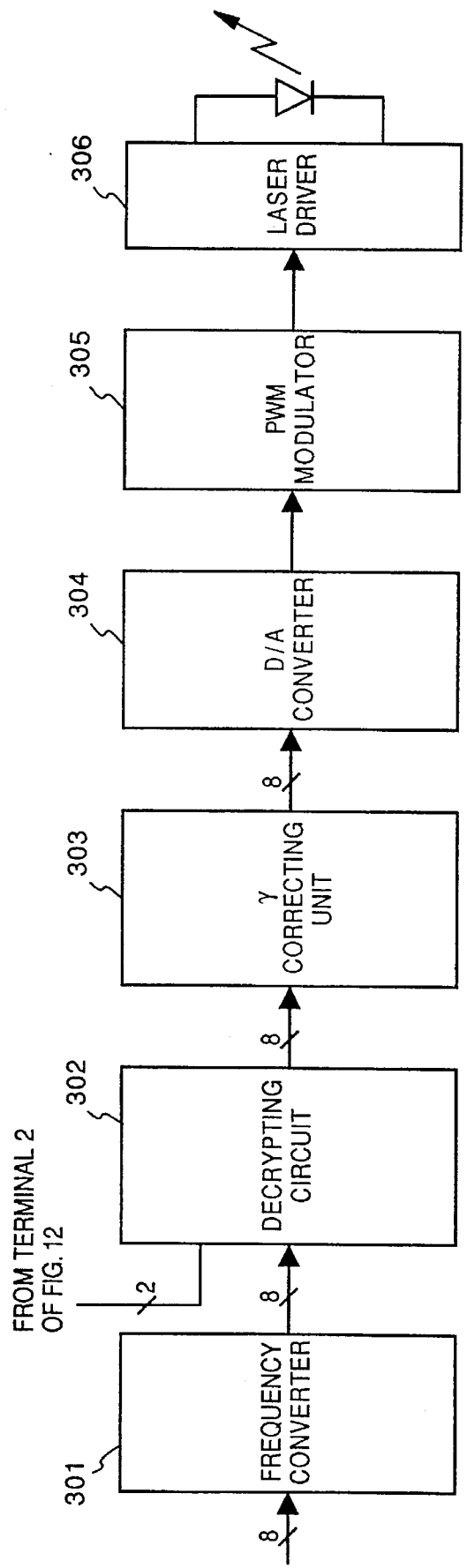

FIG. 11(b)

| |
|---|
| TABLE0 |
| TABLE1 |
| TABLE2 |
| TABLE3 |

FIG. 13
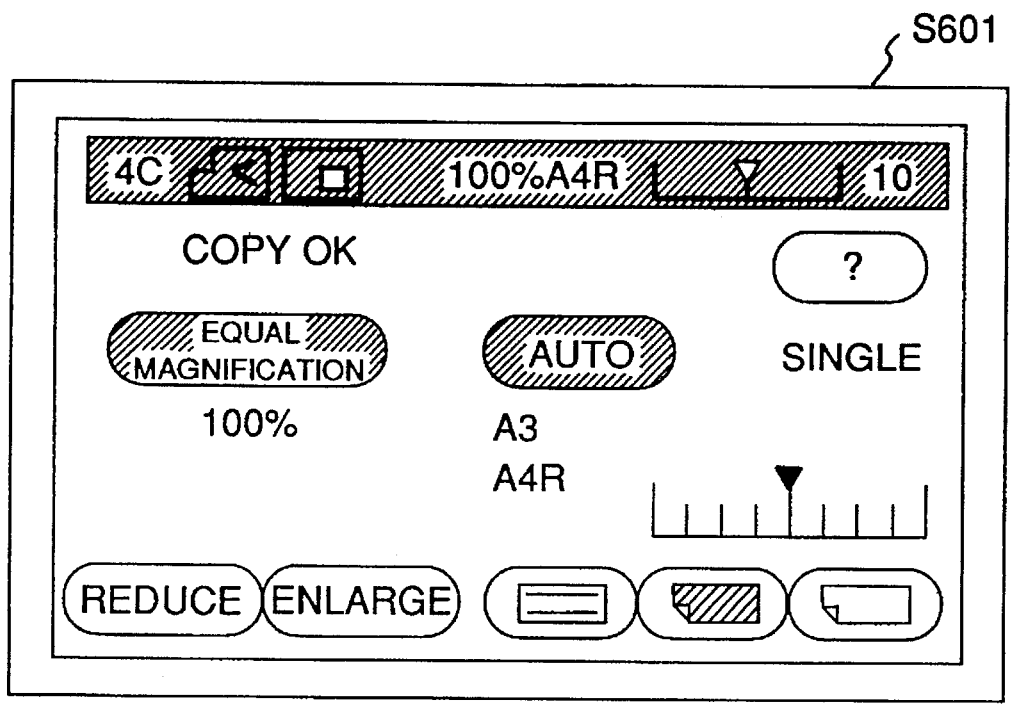
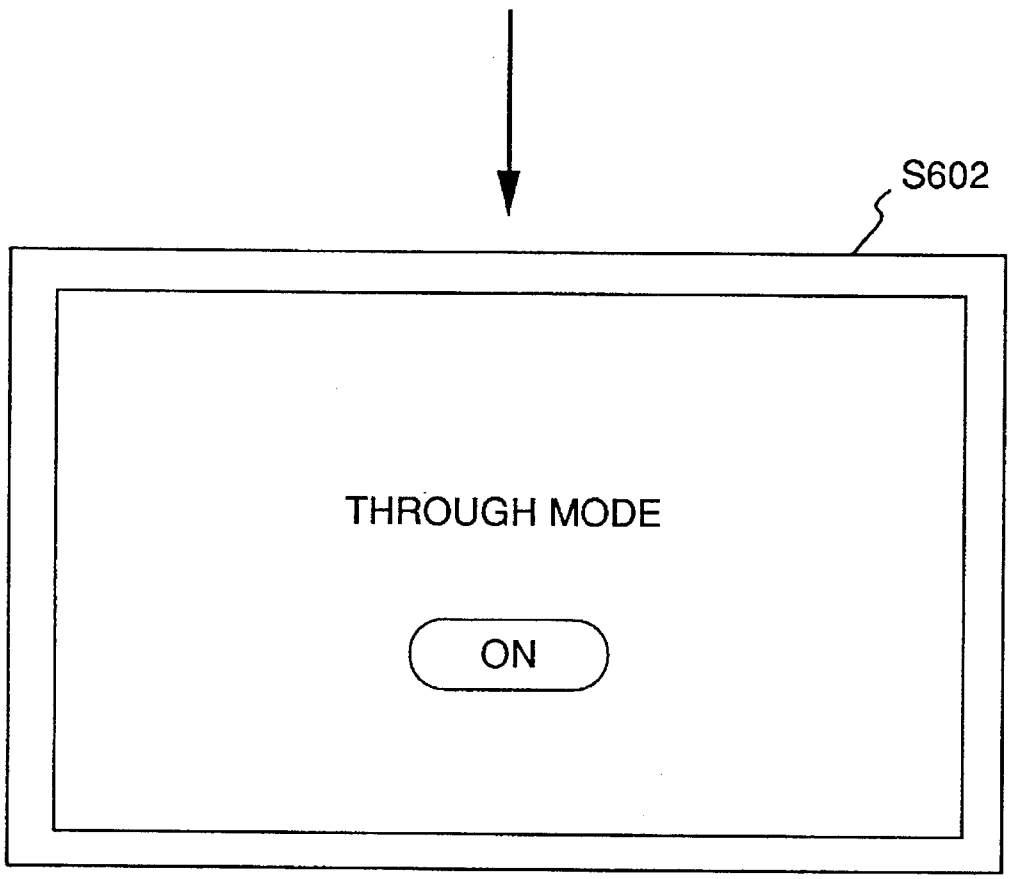

COLOR IMAGE PROCESSING APPARATUS AND METHOD

This application is a continuation of U.S. patent application Ser. No. 07/996,789 filed Dec. 23, 1992, now abandoned.

BACKGROUND OF THE INVENTION

1. Field of the Invention

The present invention relates to an image processing system and a color image processing apparatus for processing image signals by encrypting the signals.

2. Related Arts

Recently, as the performance of color copying machines has been improved, crimes of forging documents, such as paper monies or securities, by using these copying machines illegally have increased in number.

To prevent such crimes, a system has been studied in which data of image patterns representing documents, such as paper monies and securities, are registered in a copying machine itself beforehand, and an image identifying circuit identifies these registered data, thereby forcibly inhibiting illegal copying in accordance with the identification result. However, since the number of registrable image patterns is limited in a forgery preventing circuit of this type, it is impossible to register all available documents, such as paper monies and securities.

In addition, in the case of a color copying machine separable into a reader unit and a printer unit, even when a document consistent with a registered image pattern is to be copied, the circuit of the above sort cannot function if the original reader unit is replaced with another reader unit.

Also, connecting an unsuitable apparatus to the copying machine, even though it is not an illegal use as described above, lowers the signal level due to impedance mismatch between the two apparatuses, resulting in an adverse influence, such as an increase in noise of an image signal. This may interfere with the operation of the color copying machine main body and consequently introduce disadvantages to users.

SUMMARY OF THE INVENTION

It is an object of the present invention to provide an image processing apparatus or system capable of solving the above conventional problems.

It is a principal object of the present invention to provide an image processing apparatus or system capable of preventing, with an inexpensive arrangement, illegal uses which may be caused by connecting an image processing apparatus with an inadequate interface in performing transmission/reception of image signals between the image processing apparatuses, thereby eliminating adverse influences on the main image processing apparatus to introduce no disadvantages to users.

It is another object of the present invention to provide an encrypting method suitable for multivalued image data.

It is still another object of the present invention to provide an image processing apparatus for constituting the above image processing system.

It is still another object of the present invention to provide an interface or image processing system with a novel function.

In order to achieve the above objects, a preferred embodiment of the present invention discloses an image processing system in which an image processing apparatus on the transmission side comprises encrypting means for encrypting image signals, and an image processing apparatus on the reception side comprises decrypting means for decrypting encrypted signals, thereby performing encrypting for signals being transmitted.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 8 is a block diagram showing an image reader unit of a color copying apparatus according to the fifth embodiment of the present invention;

FIG. 9 is a sectional view showing the color copying apparatus according to the fifth embodiment;

FIG. 10 is a block diagram showing a printer signal processor according to the fifth embodiment;

FIGS. 11(a) and 11(b) are schematic views showing an encrypting circuit according to the fifth embodiment;

FIG. 13 is a view showing a panel unit in a through mode according to the fifth embodiment;

DETAILED DESCRIPTION OF THE PREFERRED EMBODIMENTS

A preferred embodiment of the present invention will be described in detail below with reference to the accompanying drawings.

1st Embodiment

Figure 1:
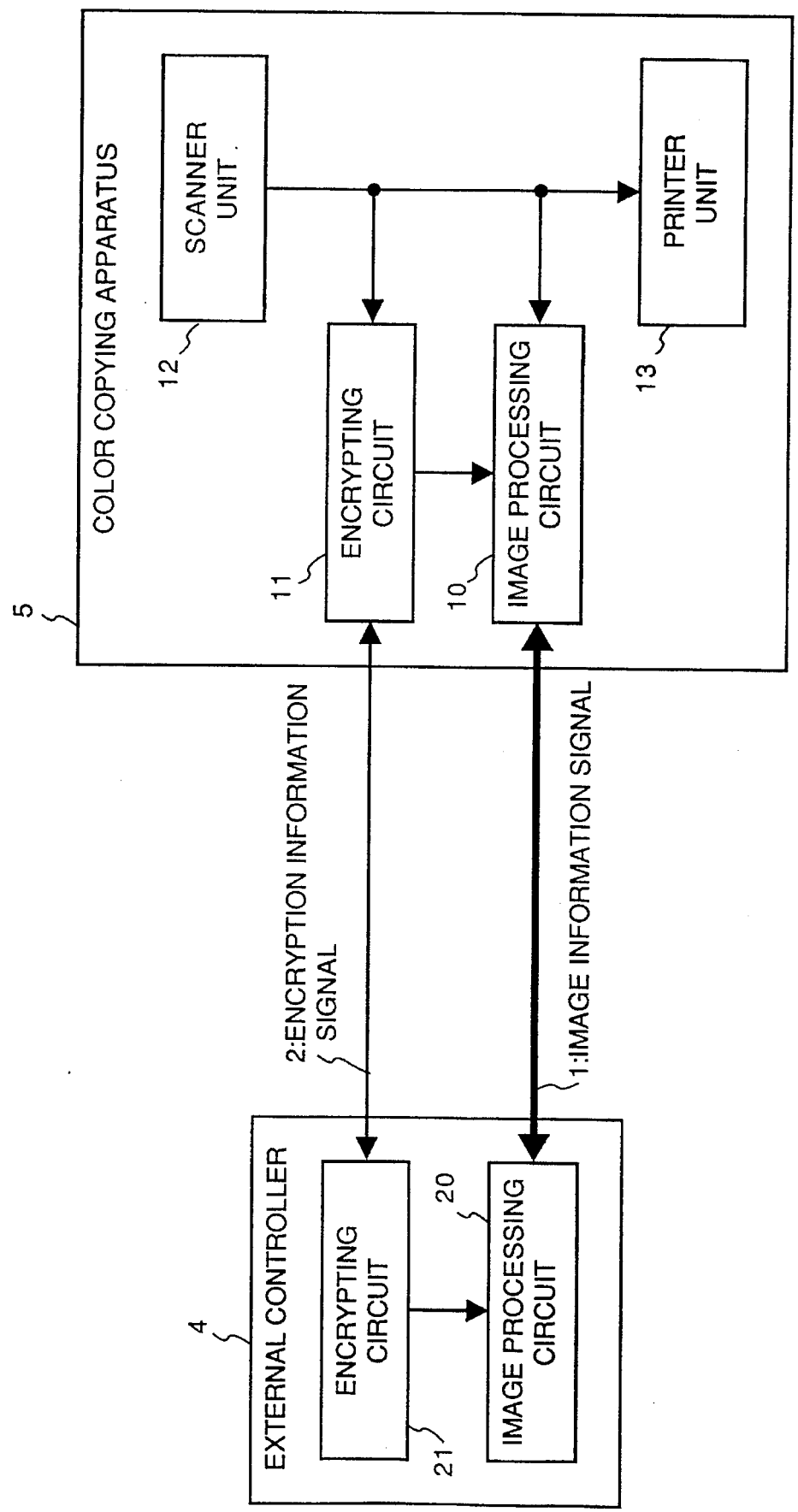
FIG. 1 is a block diagram showing an image processing system according to the first embodiment of the present invention.

FIG. 1 is a block diagram showing an image processing system according to the first embodiment of the present invention. Referring to FIG. 1, this system is separated into a color copying apparatus 5 incorporating a scanner unit 12 and a printer unit 13, and an external controller 4 as an interface for performing input/output of color images with respect to an external image processing apparatus. The color copying apparatus 5 may, of course, be constituted by a scanner and a printer independent of each other.

The color copying apparatus 5 and the external controller 4 are electrically connected to each other through a signal line for transmitting an image information signal 1 as color image data and a signal line for transmitting an encryption information signal 2 as information concerning encryption. The encryption information signal 2 is a signal for transmitting information concerning encryption as described above and is exchanged through a bidirectional signal line. When color image data is input from the scanner unit 12 of the color copying apparatus 5, the encryption information signal 2 is supplied from the color copying apparatus 5 to the external controller 4. The encrypted image information signal 1 is decrypted in accordance with the encryption information signal 2 by an encrypting circuit 21 and an image processing circuit 20 of the external controller 4. When color image data is output from the external controller 4 to the printer unit 13 of the color copying apparatus 5, the encryption information signal 2 is supplied from the external controller 4 to the color copying apparatus 5. The encrypted image information signal 1 is decrypted by an encrypting circuit 11 and an image processing circuit 10 of the color copying apparatus 5.

Note that image clocks, image sync signals, communication lines for performing condition control of the apparatus, and the like are omitted from FIG. 1.

The color copying apparatus 5 incorporates the encrypting circuit 11 for controlling the image processing circuit 10. The encrypting circuit 11 performs encryption in transmitting color image data to the external controller 4 and decryption upon receiving color image data from the external controller 4.

That is, in sending color image data read by the scanner unit 12 to the external controller 4, the encrypting circuit 11 generates data related to encryption to be supplied to the external controller 4.

When color image data is supplied from the external controller 4 to the printer unit 13, the encrypting circuit 11 generates data for decrypting the data from the external controller 4.

In the color copying apparatus 5, encryption is performed when color image data is to be supplied to the external controller 4, and decryption, which is the inverse process of encryption, is performed when color image data is supplied from the external controller 4 to the printer unit 13; these two modes are executed by a combination of the encrypting circuit 11 and the image processing circuit 10. There is another mode, a forgery preventing mode of the color copying apparatus itself. A configuration for this mode is incorporated in the image processing circuit 10. That is, a determining circuit is incorporated as a forgery preventing function to be executed when the printer unit 13 is to copy an image read by the scanner unit 12. If this determining circuit determines that copying is for forgery, the printer unit 13 is disabled to perform a copying operation.

The external controller 4 includes the encrypting circuit 21 and the image processing circuit 20, which performs decryption of the image information signal 1 directly or indirectly upon receiving the encryption information signal 2. When the external controller 4 is connected to a host computer, the image processing circuit 20 directly encrypts color image data supplied from the host computer. In this case, the image processing circuit executes the encryption by receiving an encrypting instruction from the encrypting circuit 21. The external controller 4 performs encryption in sending color image data to the color copying apparatus 5 and decryption upon receiving color image data from the color copying apparatus 5. These encryption and decryption are executed by a combination of the encrypting circuit 21 and the image processing circuit 20.

It should be noted that a plurality of types of encrypting methods are used in this embodiment.

The operation of this embodiment will be described in detail below.

Figure 2:
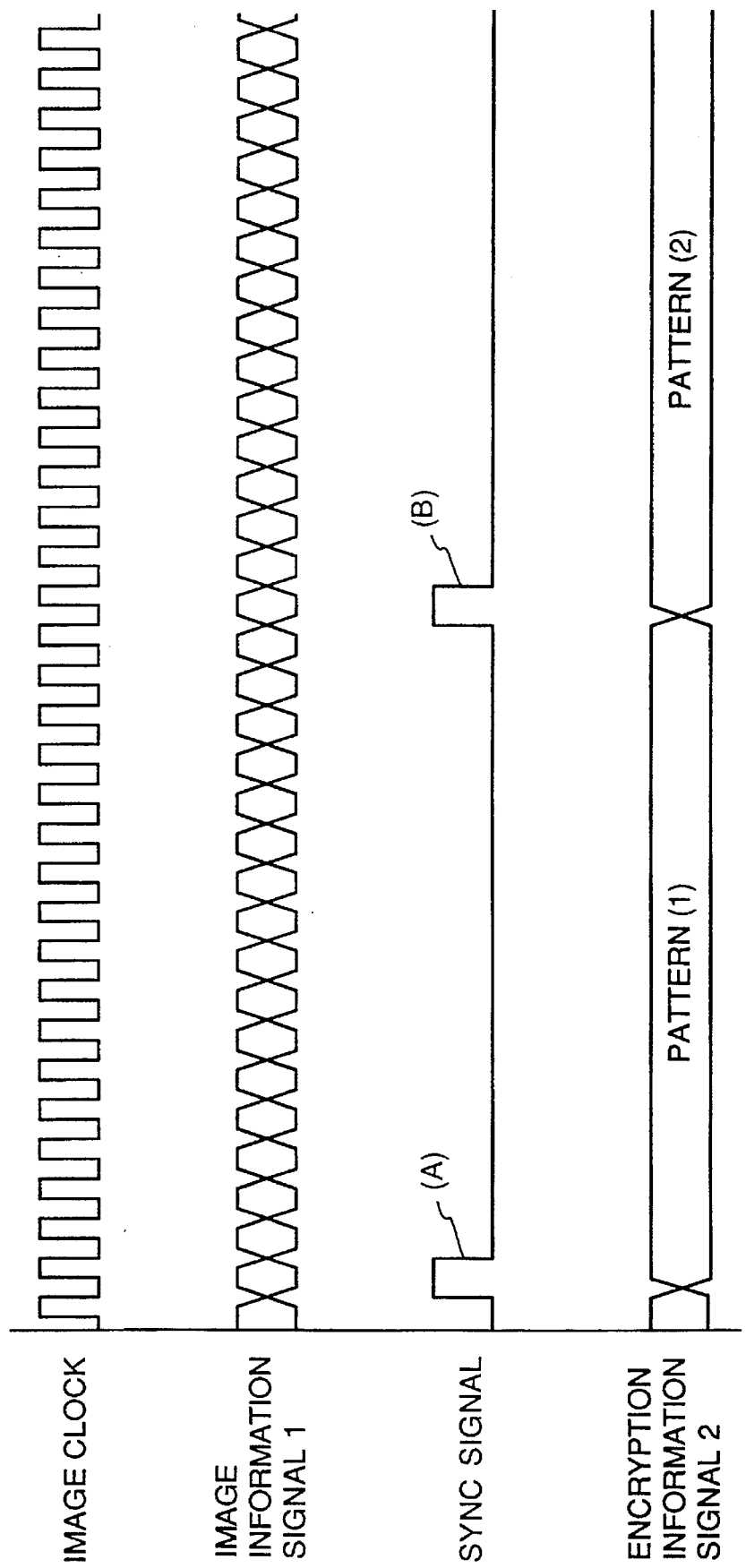
FIG. 2 is a timing chart showing control timings between signals according to the first embodiment.

FIG. 2 is a timing chart showing control timings for the image information signal 1, the encryption information signal 2, an image clock, and a sync signal.

The image clock is a clock signal serving as a reference for other signals. Referring to FIG. 2, the scanner unit reads in data of each image information signal at the leading edge of the image clock. The sync signal is used as both a sync signal for use between lines of raster image signals and a sync signal for switching the contents of the encryption information signal 2 into a pattern (1) at a leading edge (A) and a pattern (2) at a leading edge (B). Each pattern represents the encryption signal described above and contains a number indicating the type of encryption, numerical information concerning synchronization, and the like.

According to the first embodiment as described above, a cryptogram understandable only between the external controller 4 and the color copying apparatus 5, which have the same specifications, is used. The use of this cryptogram can prevent replacement with an illegal external controller incapable of decrypting the cryptogram, for example, an external controller for forgery purposes. This can effectively make it very difficult for a third person to use the system for forgery purposes.

An operation related to forgery prevention will be described first.

Figure 3:
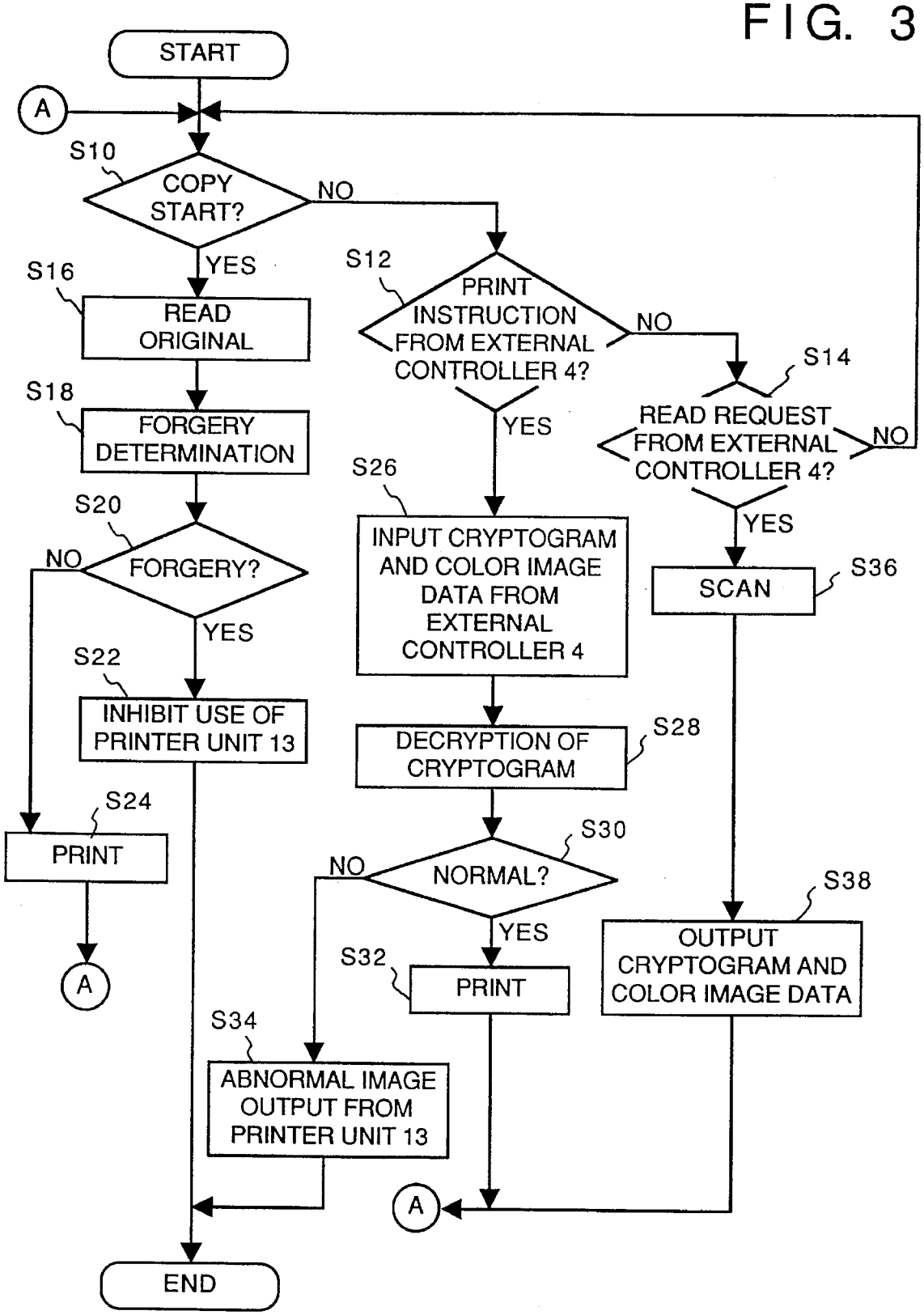
FIG. 3 is a flow chart for explaining the operation of a color copying apparatus 5 according to the first embodiment.

FIG. 3 is a flow chart for explaining the operation of the color copying apparatus 5 according to the first embodiment. Note that the operation explained below is controlled entirely by a CPU (not shown) of the color copying apparatus 5.

In steps S10, S12, and S14, any of a copy instruction from a copy start key (not shown), a print instruction from the external controller 4, and an original read instruction from the external controller 4 is detected.

If the copy instruction is detected, the scanner unit 12 reads an original (step S16), and a determining circuit (not shown) executes forgery determination based on the color image data read from the original (step S18). If the determining circuit determines that the read image is an image, the copying of which is prohibited, the use of the printer unit 13 is inhibited (step S22). If the determining circuit determines that the image is not an object of copy prohibition, the read color image data of the original is transferred to the printer unit 13 and recorded on recording paper (step S24).

If the print instruction from the external controller 4 is detected in step S12, as shown in the timing chart of FIG. 2, the encryption information signal and the color image data are supplied and at the same time decryption is performed (steps S26 and S28). In the processing operations in steps S26 and S28, if the cryptogram input processing and the decryption cannot be performed normally, as when an encryption information signal of another specification is input to disable decryption, for example, when the number of digits of data concerning encryption is detected to be different from a predetermined number, the printer unit 13 prints out an abnormal image (step S34). On the other hand, when the encryption information signal input and the decrypting are performed normally, the color image data is acquired from the external controller 4 and recorded on a recording paper by the printer unit 13 (step S32).

Note that whether the cryptogram input processing and the decryption are performed normally may be detected by another method.

If the original read instruction from the external controller 4 is detected in step S14, the scanner unit 12 reads an original image (step S36), and an encryption information signal is formed. The encryption information signal and the color image data are output to the external controller 4, as shown in the timing chart of FIG. 2 (step S38).

When the external controller 4 performs decryption normally, the external controller 4 is allowed to send the color image data decryption normally to an external device, such as a host computer connected to the external controller 4; if not normally, the external device, such as a host computer, will receive unreproducible data. This eventually results in an inability to perform normal printing and hence in failing of forgery.

In the above operation, even if a user does not have a strict security as to the management of the color copying apparatus and the external controller so that no other third person is allowed to operate the apparatuses, forgery prevention can be realized satisfactorily without using the internal determining circuit of the color copying apparatus.

In particular, since the color copying apparatus 5 or the external controller 4 arbitrarily determines the type of encryption, the printer unit can be controlled to be inoperable even if the image processing circuit of the color copying apparatus 5 or the external controller 4 is replaced with another.

2nd Embodiment

The above first embodiment employs a method using an encryption information signal and an image information signal which are independent of each other. In the second embodiment, a method using a composite signal having an encryption information signal and an image information signal is used.

Figure 4:
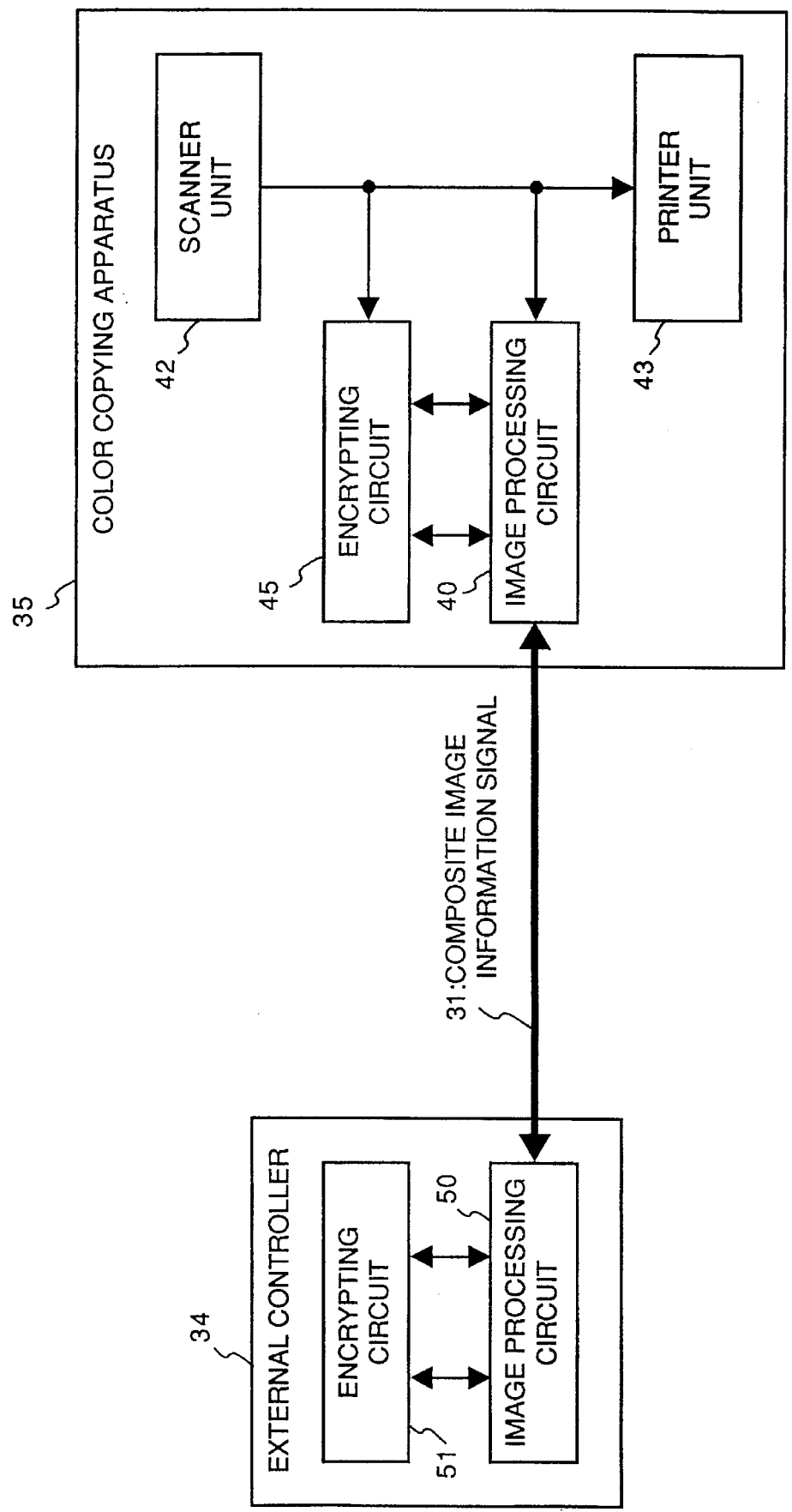
FIG. 4 is a block diagram showing an image processing system according to the second embodiment of the present invention.

FIG. 4 is a block diagram showing an image processing system according to the second embodiment.

This embodiment brings about an effect of making illegal uses more difficult by reducing the number of signal lines by combining them and by consolidating information concerning encryption and color image data together.

The second embodiment of the present invention will be described in detail below.

In this embodiment, an external controller 34 as one apparatus comprises an encrypting circuit 51 and an image processing circuit 50, as in the first embodiment, while a color copying apparatus 35 as the other apparatus comprises an encrypting circuit 45, an image processing circuit 40, a scanner unit 42, and a printer unit 43. A composite image information signal 31 which is a combination of the encryption information signal 2 and the image information signal 1 described above with reference to FIG. 1 is exchanged between the image processing circuits 50 and 40.

Since the signals are combined in the external controller 34 and the color copying apparatus 35, the interconnection between the image processing circuit 10, the encrypting circuit 11, the image processing circuit 20, and the decrypting circuit (not shown) shown in FIG. 1 is altered to an interconnection between the image processing circuit 40, the encrypting circuit 45, the image processing circuit 50, and a decrypting circuit (not shown).

Figure 5:
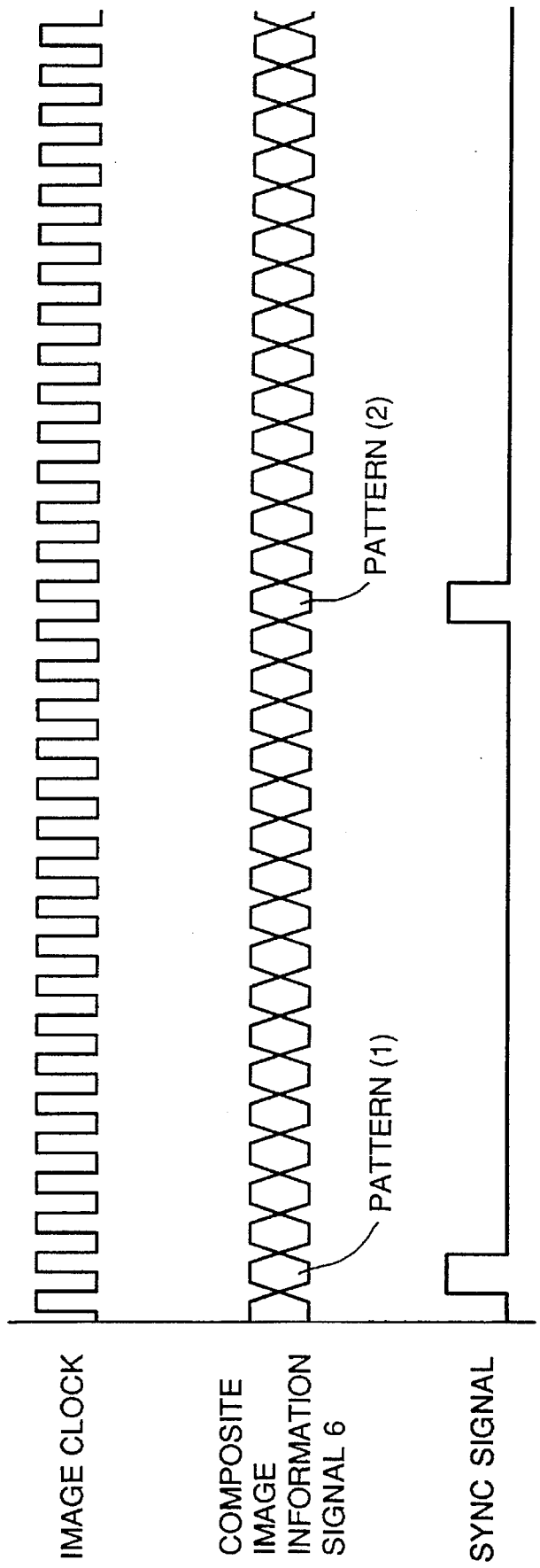
FIG. 5 is a timing chart showing control timings between signals according to the second embodiment.

FIG. 5 is a timing chart showing control timings among an image clock, a composite image information signal, and a sync signal, according to the second embodiment.

Referring to FIG. 5, in contrast to the timing chart of FIG. 2 explained above in the first embodiment, a pattern (1) or (2), i.e., information such as a number indicating the type of encryption and numerical information associated with synchronization are output during an effective period (period of level HIGH) of the sync signal, and an image information signal is output during an ineffective period (period of level LOW) of the sync signal, thereby performing decryption. In this manner, the image information signal and the encryption information signal can be transmitted together through a single signal line, so the number of signal lines is reduced.

In using the color copying apparatus 35 as an independent scanner or printer, the image processing circuit 40 and the encrypting circuit 45 operate in association with each other to mix the encryption information signal with the image information signal or to put the encryption pattern into the image, thereby outputting the composite image information signal to the external controller 34. When the image information signal (color image data) as a portion of the composite image information signal 31 is to be supplied from the scanner unit 42 to the external controller 34, the signal is sent from the color copying apparatus 35 to the external controller 34; when this portion is to be supplied to the printer unit 43, the signal is sent from the external controller 34 to the color copying apparatus 35. That is, bidirectional data transmission is performed. In the external controller 34, regardless of whether the color copying apparatus 35 is used as an independent scanner or printer, the image processing circuit 50 and the encrypting circuit 51 operate in association with each other to separate the encryption information signal, which is mixed in the composite image information signal 31 supplied from the color copying apparatus 35, from the composite image signal 31, thereby performing encryption and decryption.

The overall operation of this embodiment is the same as that of the first embodiment described above with reference to FIG. 3 and a detailed description thereof will be omitted.

According to the second embodiment as described above, a composite information signal which is not easy to be separated or decrypted can be obtained by combining signals. This further enhances the effect of preventing illegal uses such as forgery.

3rd Embodiment

Encryption for changing the input timing of an image information signal in real time will be described below in accordance with the third embodiment of the present invention.

The third embodiment is an example of encryption in which a timing at which effective image data is transmitted is changed for each line after the sync signal shown in FIG.

2 becomes effective. In this embodiment, therefore, the description will be made in accordance with an arrangement for transmitting an image from a controller unit to a printer unit.

Figure 6:
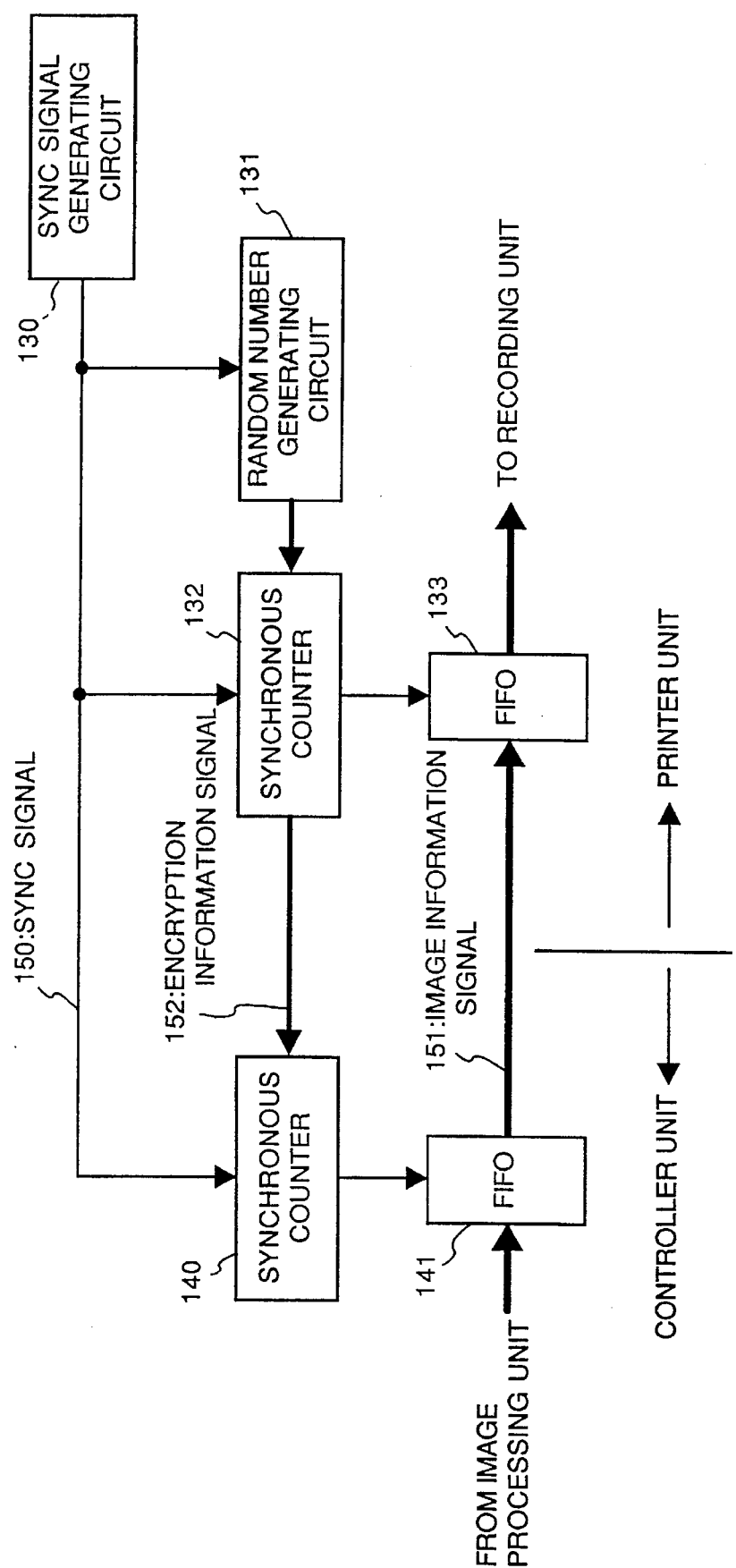
FIG. 6 is a block diagram showing the circuit configuration of a main part of an image processing system according to the third embodiment of the present invention.

FIG. 6 is a block diagram showing the circuit configuration of a main part of an image processing system according to the third embodiment. Referring to FIG. 6, a printer unit comprises a sync signal generating circuit 130, a random number generating circuit 131, a synchronous counter 132, and a first-in first-out memory (to be referred to as a "FIFO" hereinafter) 133. A controller unit comprises a synchronous counter 140 and a FIFO 141. Connections to the controller unit and the printer unit, each for use in the processing described above in the previous embodiments, an image processing unit for actually performing image processing in an image processing circuit, and a recording unit for actually performing recording in the printer unit are shown without reference numerals.

Also shown are a sync signal 150, an image information signal 151, and an encryption information signal 152.

The operation of the above arrangement will be described below.

The sync signal generating circuit 130 generates the sync signal 150 corresponding to the sync signal shown in FIG. 2. The random number generating circuit 131 randomly generates, in synchronism with the sync signal 150, a clock number by which an effective image information signal is sent after the sync signal becomes effective. For example, the random number generating circuit 131 generates an integer, such as a numeric value "10" or "15", in synchronism with the sync signal 150. This numeric value is information to be sent as the encryption information signal 152.

The synchronous counter 140 temporarily stores color image data supplied from the image processing unit of the image processing circuit into the FIFO 141 and changes, in accordance with the encryption information signal 152, a timing at which this color image data is read out from the FIFO 141. That is, the synchronous counter 140 receives the encryption information signal 152 at its initial value set input terminal, counts a timing at which data is to be read out from the FIFO 141, and changes the read timing in accordance with data generated by the random number generating circuit 131, i.e., the image information signal 151.

In this manner, the image information signal 151 shown in FIG. 6 is output to the recording unit as a signal having sync timings different between lines.

In the printer unit, on the other hand, in storing the image information signal 151 in the FIFO 133, the signal is stored from color image data corresponding to the leading end of an image in accordance with the timing signal generated by the synchronous counter 132. Therefore, the signal read out from the FIFO 133 and sent to the recording unit is a synchronized signal.

According to the third embodiment as described above, forgery prevention can be realized with a relatively simple circuit configuration.

4th Embodiment

The fourth embodiment of the present invention uses a method of changing an image information signal itself in real time in performing encryption. More specifically, in the fourth embodiment, a plurality of data conversion patterns are prepared beforehand by using a look-up table (to be referred to as an "LUT" hereinafter) and selected in a random manner to perform encryption of an image information signal.

Figure 7:
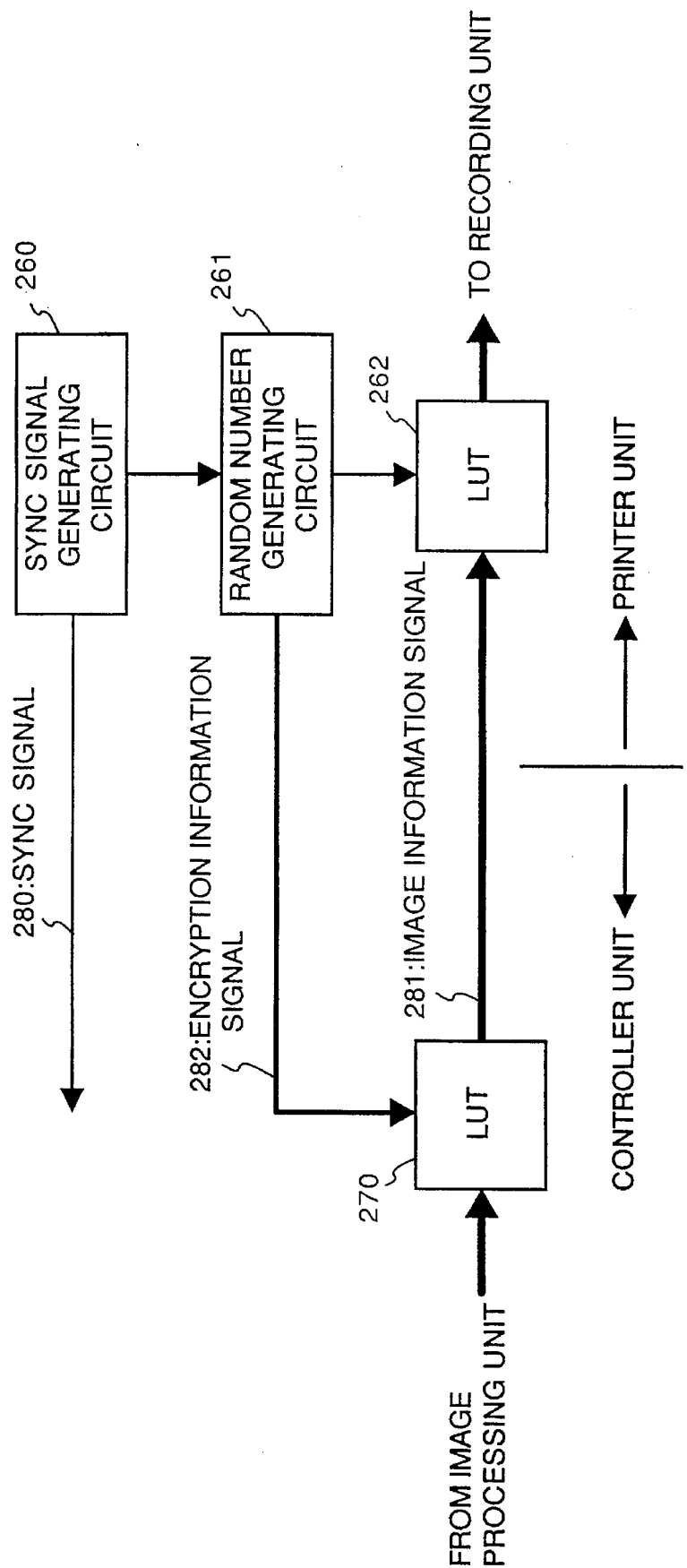
FIG. 7 is a block diagram showing the circuit configuration of a main part of an image processing system according to the fourth embodiment of the present invention.

FIG. 7 is a block diagram showing the circuit configuration of a main part of an image processing system according to the fourth embodiment. Referring to FIG. 7, a printer unit comprises a sync signal generating circuit 260, a random number generating circuit 261, and an LUT 262 for storing a plurality of data conversion patterns as described above. A control unit comprises an LUT 270 which also stores a plurality of data conversion patterns as described above. Parts with no reference numerals are the controller unit and the printer unit, each for use in the processing described above in the previous embodiments, an image processing unit for actually performing image processing in an image processing circuit, and a recording unit for actually performing recording in the printer unit.

Signals are a sync signal 280, an image information signal 281, and an encryption information signal 282.

The operation of the above arrangement will be described below.

Referring to FIG. 7, the sync signal generating circuit 260 generates the sync signal 280 corresponding to the sync signal shown in FIG. 2. The random number generating circuit 261 randomly generates, in synchronism with the sync signal 280, a pattern number to be selected from the image conversion table. The sync signal generating circuit 260 generates an integer, such as a numeric value "9" or "14" in synchronism with the sync signal 280. This numeric value is information to be sent as the encryption information signal 282. The LUT 270 executes image conversion for color image data supplied from the image processing unit in accordance with the data conversion pattern corresponding to the encryption information signal 282. That is, the LUT 270 connects the encryption information signal 282 to its pattern select input terminal to execute conversion of the image data. The image information signal 281 is transmitted to the LUT 262 as data image-converted by the LUT 270.

In the printer unit, on the other hand, upon receiving the image information signal 281, the LUT 262 selects a data conversion pattern which is for a reverse process of the data conversion pattern used by the LUT 270 in accordance with the random number generated by the random number generating circuit 261, thereby executing processing for restoring the original color image data.

In this manner, as in the third embodiment, illegal use prevention can be realized with a relatively simple circuit configuration.

Note that each of the above first to fourth embodiments makes use of a relatively simple encrypting method. However, the use of a more complicated encrypting method further enhances the effect of the present invention.

In addition, a combination of an arrangement, in which encryption information is transmitted by using a communication line through which commands or statuses concerning operations are exchanged, and the arrangement of performing encryption according to any of the above embodiments, makes it possible to construct a sophisticated encrypting environment where apparatuses cannot be easily used by a third person.

Each of the preceding embodiments has been described as a system in which an external controller is connected to a color copying apparatus through a bus, but the present invention is not limited to these embodiments. For example, an external controller may be detachably provided, like a cassette, to a color copying apparatus.

Note that the present invention may be applied to either a system constituted by a plurality of devices or an apparatus comprising a single device. Note also that the present invention can be similarly applied to the case wherein the present invention is achieved by supplying programs to a system or an apparatus.

5th Embodiment

FIG. 9 is a sectional view showing the arrangement of a color image processing apparatus according to the fifth embodiment of the present invention.

Referring to FIG. 9, an image scanner unit 201 is for reading an original at a resolution of, e.g., 400 dpi (dot/inch) to perform digital signal processing. The image scanner unit 201 comprises a mirror-surface press plate 200, an original glass 203, a lamp 205, mirrors 206 to 208, a lens 209, a 3-line sensor (to be referred to as a CCD hereinafter) 210, and a transmission signal processing unit 211.

A printer unit 202 is for printing an image signal from the image scanner unit 201 on paper in full color. The printer unit 202 comprises a printer reception signal processing unit 212, a semiconductor laser 213, a polygon mirror 214, an f-θ lens 215, a mirror 216, a photosensitive drum 217, a rotary developing device 218, developing units 219, 220, 221, and 222 for magenta, cyan, yellow, and black, respectively, a transfer drum 223, paper cassettes 224 and 225, a fixing unit 226, and a power supply unit 227.

The operation of the image scanner unit 201 will be described below. An original 204 placed on the original table 203 is illuminated by the lamp 205, and light reflected by the original is guided toward the lens 209 by the mirrors 206 to 208 and focused by the lens 209 to form an image on the CCD 210. The image is supplied as R (red), G (green), and B (blue) (to be referred to as RGB hereinafter) components to the signal processing unit 211. Note that the lamp 205 and the mirror 206 perform electrical scanning for the line sensor at a rate of v, and the mirrors 207 and 208, at a rate of ½ v.

FIG. 8 is a block diagram showing the image processing unit 211 shown in FIG. 9. Referring to FIG. 8, the RGB color signals (in this embodiment, 8-bit signals) from the CCD 210 are sampled and A/D-converted by an A/D & S/H unit 101 and subjected to shading correction (correction for a light amount variation by using data of a reference white plate (not shown)) by a shading correcting circuit 102. The consequent signals are subjected to timing correction (for correcting spatial deviations derived from the arrangement of the CCD sensors by executing electrical processing using a delay memory) in a block 103. An input masking unit 104 corrects the resultant signals into NTSC-standard color spatial signals, and a block 105 performs LOG conversion for the signals from luminance information (RGB signals) to density information Y (yellow), M (magenta), and C (cyan) (to be referred to as YMC signals hereinafter). A block 106 includes a masking unit (for correcting the color signals in accordance with the properties of toners) and a UCR circuit. The block 106 is for converting a black component of the three colors Y, M, and C by using monochromatic Bk (black) (to be referred to as Bk hereinafter) toner. A correcting unit 107 performs so-called gamma processing. An encrypting circuit 108 is for performing encryption on the basis of an encryption information signal (to be described later). The encrypting circuit 108 and an edit processing circuit 109 will be described in detail later.

Referring back to FIG. 9, in the printer unit 202, the output signal from the signal processing unit 211 is decrypted by the printer signal processing unit 212, and the semiconductor laser 213 scans the photosensitive drum 217 by a laser beam via the polygon mirror 214, the f-θ lens 215, and the mirror 216, thereby forming an electrostatic latent image on the drum. One of the Y, M, C, and Bk developing units 219 to 222 constituting the rotary developing device 218 is selected and brought into contact with the photosensitive drum 217 to develop the electrostatic latent image formed on the drum. Meanwhile, the transfer drum 223 winds and holds paper supplied from the paper cassette 224 or 225 around it and transfers the image developed on the photosensitive drum onto the paper. The above process of scanning, developing, and transfer is repeatedly executed for the four colors Y, M, C, and Bk. After the four colors Y, M, C, and Bk are transferred sequentially on the paper, the paper is fed through the fixing unit 226 to fix the toners on it and delivered in a direction indicated by an arrow shown in FIG. 9.

FIG. 10 is a block diagram showing the printer signal processing unit 212. Referring to FIG. 10, a frequency converter 301 performs frequency conversion for synchronizing a signal supplied from the scanner unit 201 with the clock of the printer unit. A FIFO is used commonly as the frequency converter 301. A decrypting circuit 302 is for decrypting the signal frequency-converted by the frequency converter on the basis of encryption method data (to be described later). The internal arrangement of the decrypting circuit 302 will be described later.

A correcting unit 303 performs correction for a printer density change caused by an environmental variation. In this embodiment, a dot pattern unrecognizable to human eye but readable mechanically is output in synchronism with an image signal in the correction. This dot pattern is encrypted in accordance with a specific cryptogram of the copying apparatus and synthesized on a copy output, thereby additionally performing a forgery preventing function. The signal which is γ-corrected by the γ correcting unit 303 is D/A-converted by a D/A converter 304 and subjected to pulse width modulation by a PWM modulator 305. Thereafter, a laser driver 306 drives the semiconductor laser 213 for each of the Y, M, C, and Bk signals.

Figure 11A:
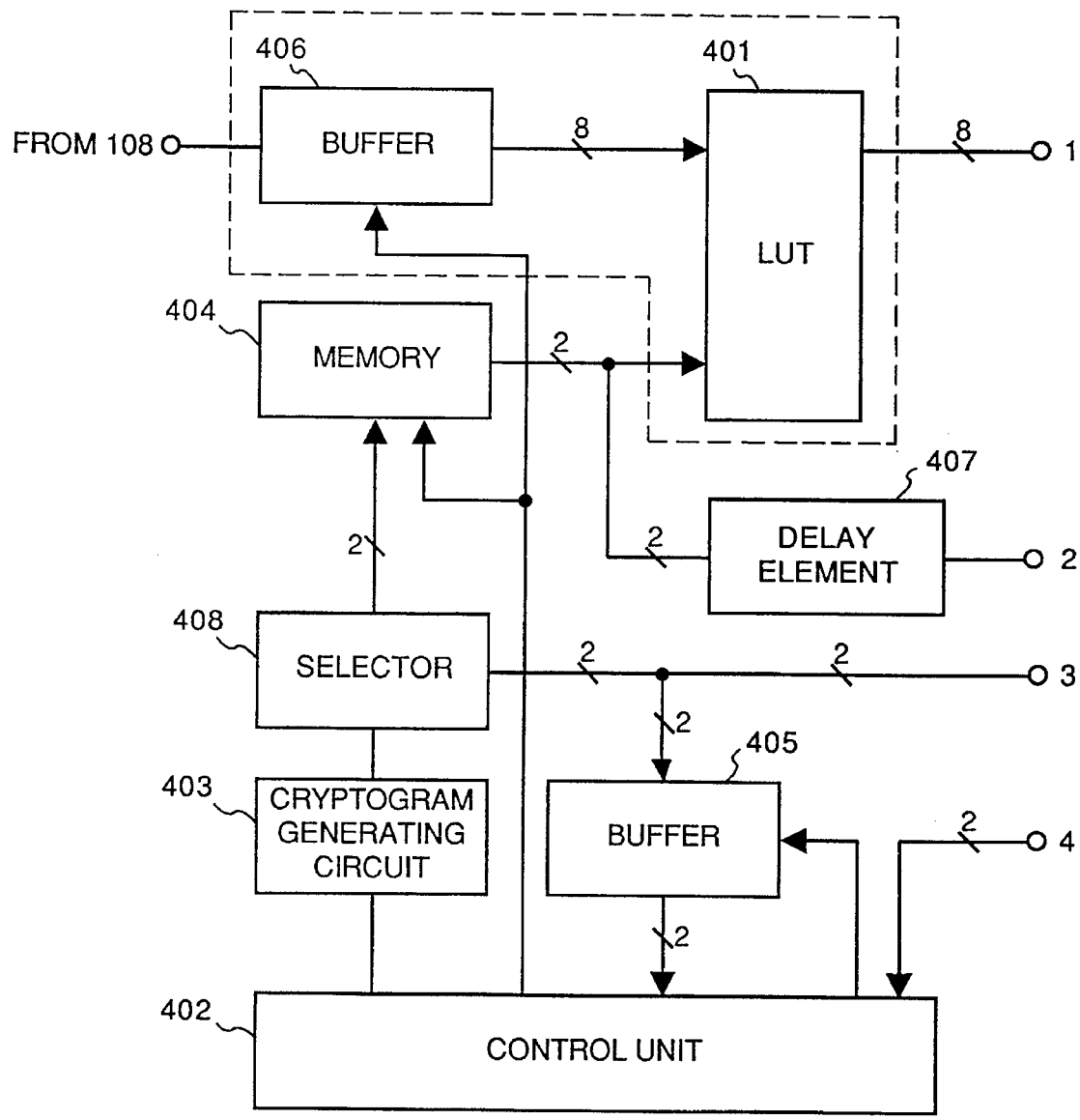
Figure 11B:
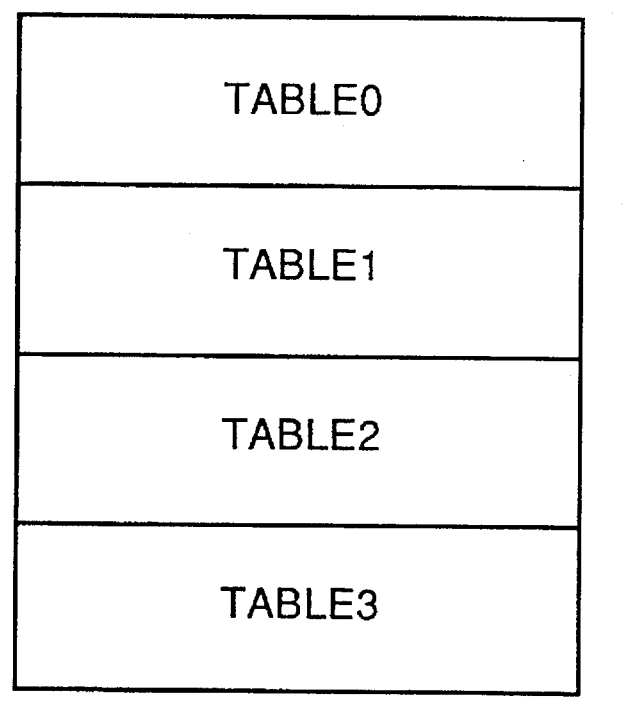

FIG. 11(a) shows a control unit connected to the encrypting circuit 108 through a bus, in which a portion indicated by a broken line corresponds to the encrypting circuit 108 shown in FIG. 8. An LUT 401 is constituted by a ROM or a RAM, in which functions are stored in a one-to-one correspondence in memory areas. In the case of a ROM, predetermined functions are written in advance; in the case of a RAM, a function corresponding to selection by a user is used. The number of memory areas is four in correspondence with encryption method data (in this embodiment, 2-bit data), as shown in FIG. 11(b), and one of the four areas is assigned to a through mode in which no encryption is performed. This arrangement is constituted by a control unit 402, a cryptogram generating circuit 403, a memory 404, buffers 405 and 406, a delay element 407, and a selector 408 for determining the output direction of a signal.

Note that a terminal 1 is for transmitting encrypted image data and a terminal 2 is for transmitting encryption method data for designating a memory area in the LUT 401. A terminal 3 transmits encryption method data, and a terminal 4 receives the encryption method data. By comparing the data transmitted and received by these terminals, whether the scanner unit and the printer unit are connected properly can be determined.

The operation of the encrypting circuit will be described below with reference to FIGS. 11(a) and 11(b). The control unit 402 supplies a select start signal to the cryptogram generating circuit 403, and 2-bit encryption method data is selected at a timing to be described later in accordance with this signal by a random number generating scheme or the like. The selected data is supplied to the buffer 405 and the decrypting circuit through the selector 408. Data transmitted from the decrypting circuit through the terminal 4 is compared with the original data stored in the buffer 405. If the two data equal each other, the encryption method data is sent to the memory 404 through the selector 408, and a clock is applied to the memory 404 and the buffer 406, thereby supplying the encryption method data and an image signal to the LUT 401. If the two data do not equal each other, no image data is applied so as not to enable a copying operation as will be described later. The LUT 401 selects a table corresponding to a memory area according to the encryption method data and allows it to act on the image signal from the buffer 406, thereby generating and transmitting an encrypted signal to the decrypting circuit. The delay element 407 delays transmission of the encryption method data by a time required for the LUT 401 to encrypt the image signal.

Figure 12:
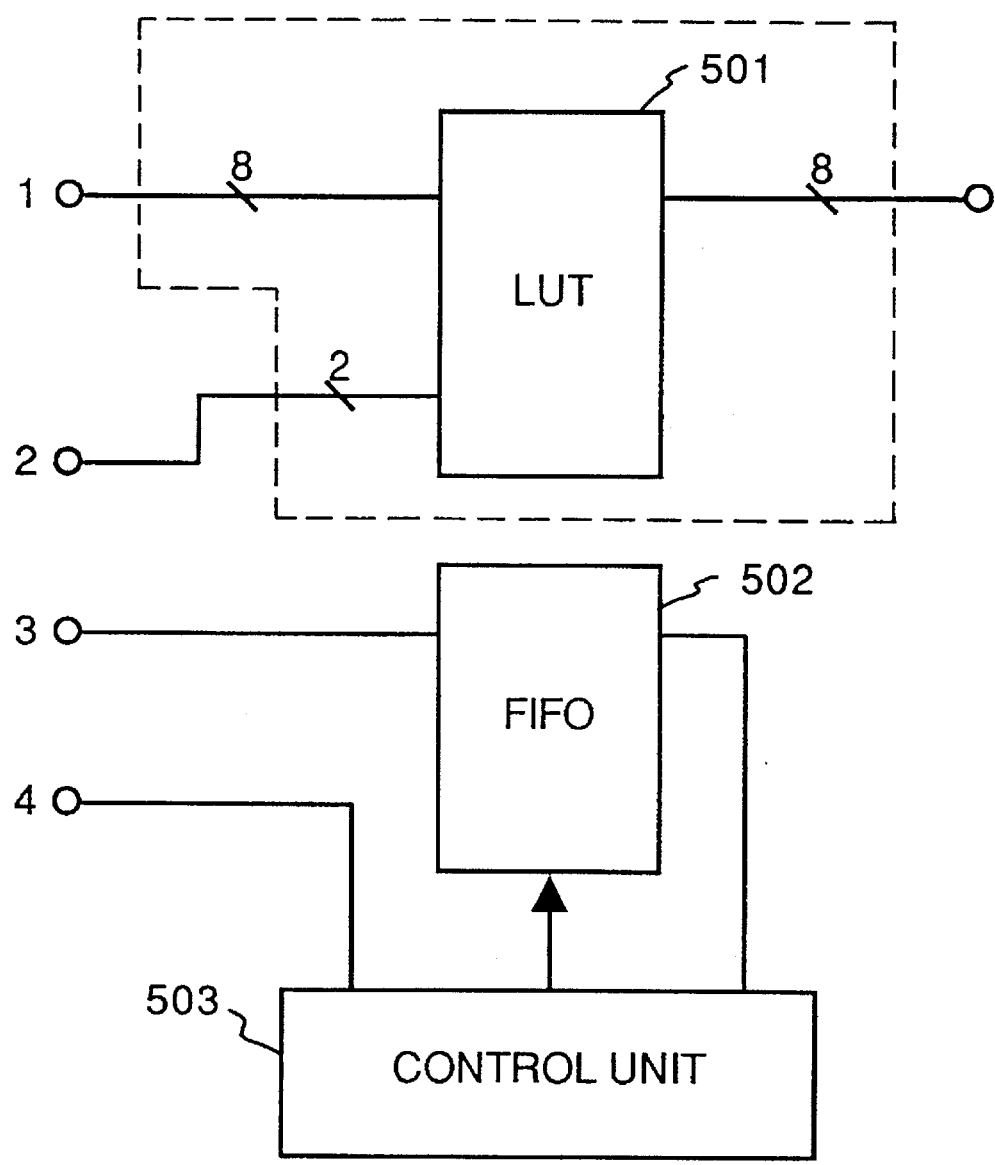
FIG. 12 is a schematic view showing a decrypting circuit according to the fifth embodiment.

FIG. 12 shows a control unit connected to the decrypting circuit 302 through a bus, in which a portion indicated by a broken line corresponds to the interior of the decrypting circuit shown in FIG. 10. An LUT 501 is constituted by a ROM or a RAM like the LUT 401 shown in FIG. 10. The arrangement also includes a FIFO 502 and a control unit 503.

The operation of the decrypting circuit will be described below with reference to FIG. 12. The encryption method data supplied from the control unit on the scanner side is stored in the FIFO 502. In accordance with the clock from the control unit 503, the encryption method data is transmitted from the FIFO 502 to the control unit on the scanner side via the control unit 503. If the control unit on the scanner side determines that the encryption method data from the control unit on the printer side is adequate, an encrypted signal is transmitted to the LUT 501, and at the same time the control unit of the encrypting circuit transmits the encryption method data. The LUT 501 performs decryption by allowing the function in the memory area determined by the encryption method data to act on the encrypted signal. Note that the function in the memory area of the LUT 501 corresponding to the encryption method data is the inverse function of the function in the memory area of the LUT 401 shown in FIG. 11(*a*) corresponding to that data.

FIG. 13 shows a panel for a through mode in which no encryption is performed. An example of the through mode will be described below with reference to FIG. 13. Referring to FIG. 13, S601 indicates a regular screen for accepting copying, and, when a predetermined key operation is performed on an operation unit (not shown), the regular screen is switched to a through mode screen as indicated by S602. The through mode is useful in checking whether an abnormal portion exists in the encrypting unit or the decrypting unit if an abnormal image is output. Note that a table for the through mode is assigned to a predetermined memory area in each of the LUT 401 of FIG. 11(*a*) and the LUT 501 of FIG. 12. In addition, if a disconnection is determined by a signal line (not shown) for monitoring the connection between the scanner unit and the printer unit, a cryptogram generating unit (not shown) in the scanner unit sends to the encrypting circuit a signal for selecting a mode except the through mode in order to prevent an illegal use of the scanner unit.

The same processing is also performed for the decrypting circuit in the printer unit.

Figure 14:
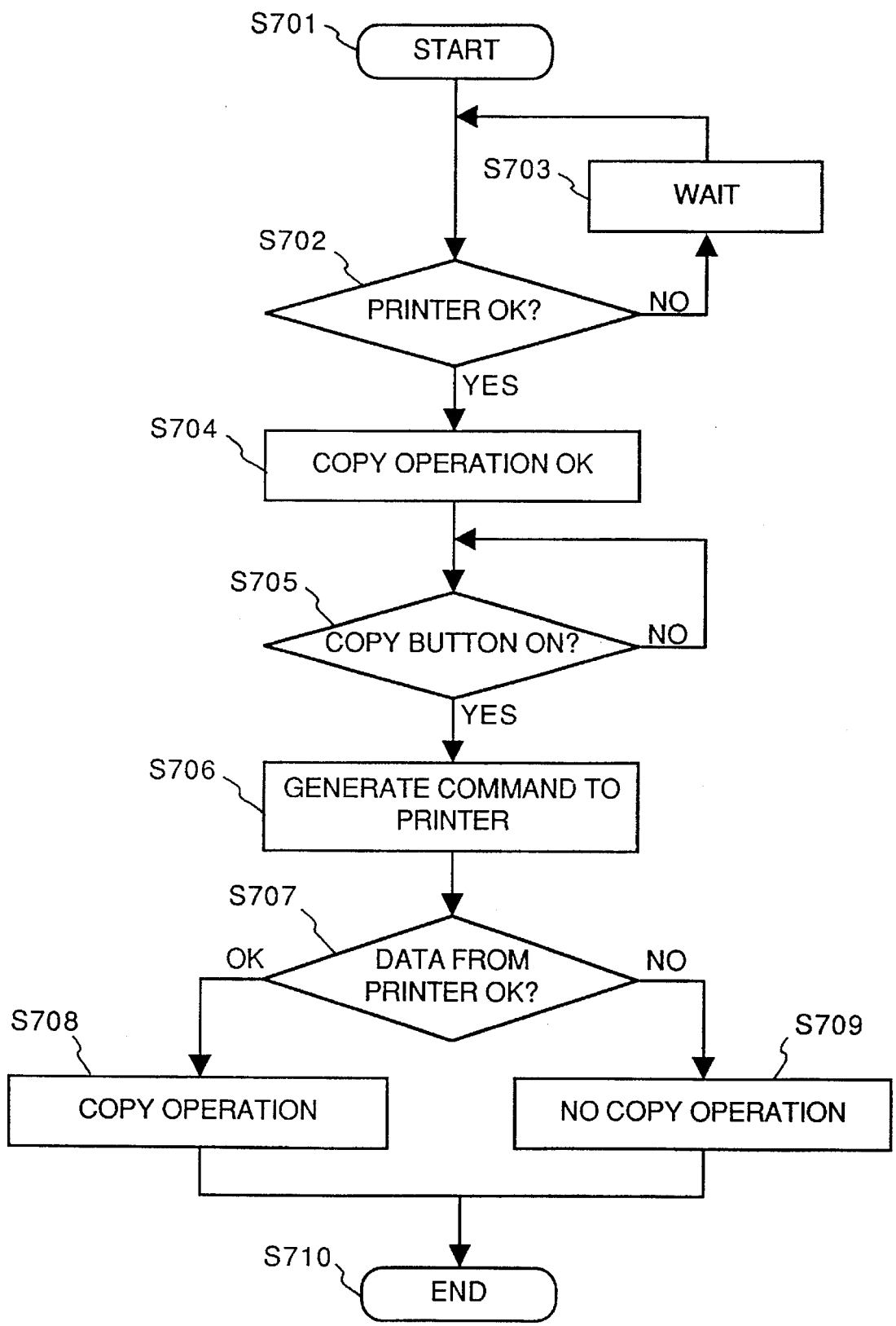
FIG. 14 is a flow chart for transmitting encryption method data at the start of an operation of image reading means according to the fifth embodiment.

Timings at which encryption method data is transmitted between the scanner unit and the printer unit will be described below with reference to FIGS. 14 to 16. An example of transmitting encryption method data at the start of an image read operation will be described first with reference to a flow chart shown in FIG. 14. Referring to FIG. 14, when a power supply of the main body is switched on, a wait state display is performed until the printer unit becomes usable (S702 and S703). When the use of the printer unit is enabled, copy OK is displayed (S704). The system stands by until an image read operation is started, i.e., a copy button is depressed. If the copy button is depressed (S705), the image scanner unit generates a command (command data designating that encryption method data + transmission data is encryption method data) to the printer unit through the terminal 3 shown in FIG. 11(*a*) (S706). In this case, encryption method data other than that for the through mode is transmitted to the encrypting circuit as described above unless otherwise designated on the operation unit. Subsequently, the scanner unit receives data corresponding to the command from the printer (S707). If the data transmitted from and received by the scanner unit equal each other, a copy operation is performed (S708); if not, no copy operation is performed (S709).

Figure 15:
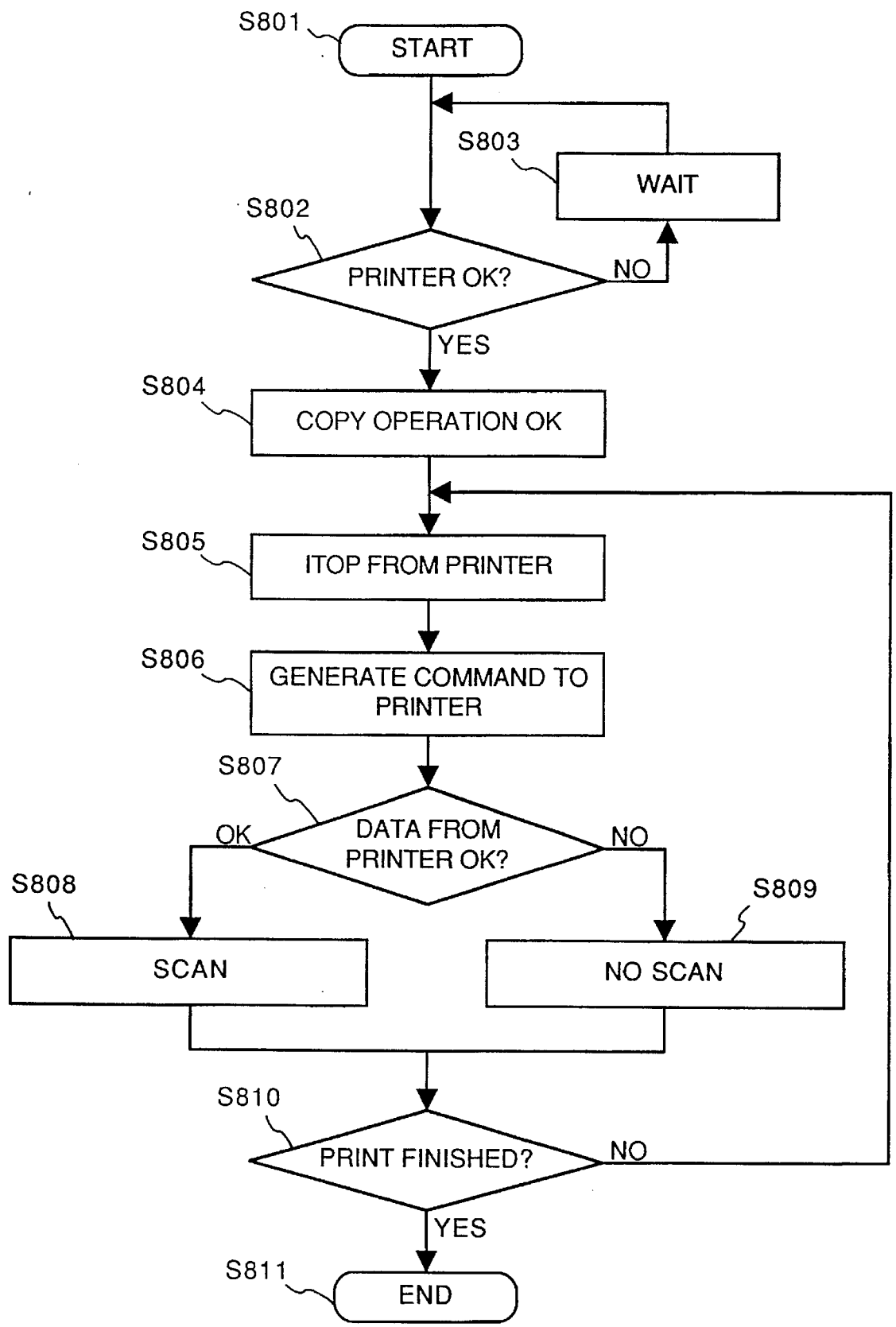
FIG. 15 is a flow chart for transmitting encryption method data at the start of frame sequential exposure of the image reading means according to the fifth embodiment.

FIG. 15 is a flow chart for transmitting encryption method data each time a frame sequential exposure for image reading is performed by the scanner unit. Referring to FIG. 15, a wait state display is performed after the power supply of the main body is switched on and before the printer unit is operable (S802 and S803). When the printer unit becomes operable, copy OK is displayed (S804). When a copy operation is started to feed paper and the scanner detects a paper leading end signal (ITOP signal), the scanner generates a command (command data designating that encryption method data + transmission data is encryption method data) to the printer (S806). Here again, a signal indicating a mode except the through mode is selected as a table select signal. The scanner receives data corresponding to the transmission data from the printer (S807). If the transmission data from and the reception data to the scanner equal each other, the scanner immediately executes scanning (S808); if not, the scanner stops the operation (S809). This embodiment in which a command is supplied for each scanning is excellent in transmitting an image not only to the printer but also to external equipment, such as an image memory.

Figure 16:
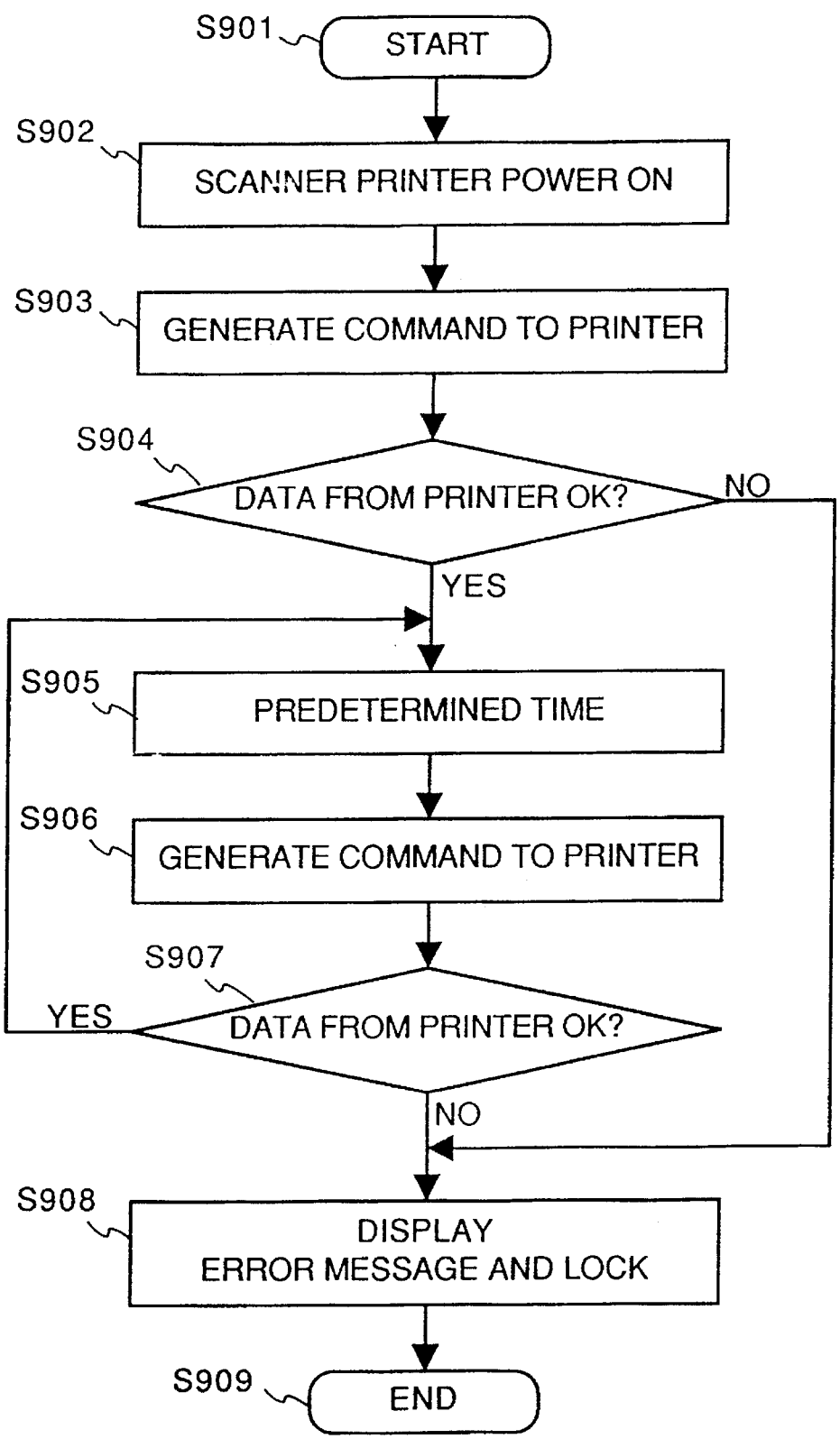
FIG. 16 is a flow chart for transmitting encryption method data upon switching on of a power supply of the color image forming apparatus and for each predetermined time interval after switching on of the power supply.

FIG. 16 is a flow chart for sending a command at the time the power supply of the main body is switched on and at each predetermined time interval after the switching ON. When the power supply of the main body is switched on (S902), the scanner generates a command (command data designating that encryption method data + transmission data is encryption method data) to the printer (S903). The scanner receives data corresponding to the command from the printer (S904). If the reception data equals the transmission data, the scanner repeatedly transmits data to the printer at each predetermined time interval (S905 to S907). The scanner repeats this operation until the reception data does not equal the table select data from the scanner any longer or the print operation is finished (S908).

An operation of edit processing will be described below with reference to FIGS. 17(*a*) to 17(*c*).

Figure 17A:
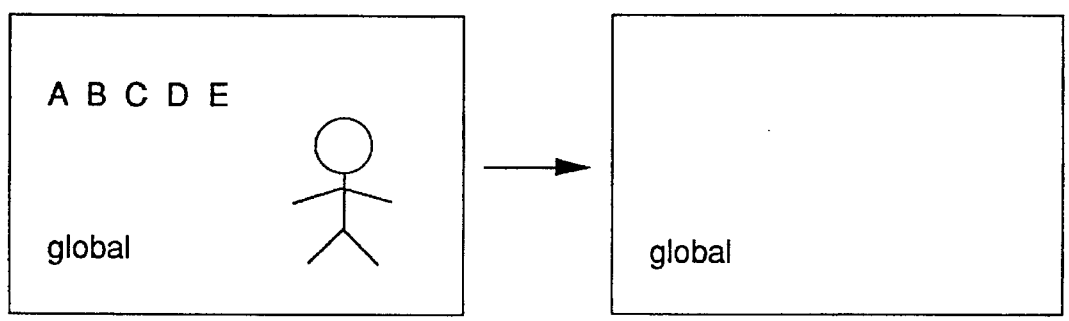
FIGS. 17(a), 17(b), and 17(c) are views showing an example of edit processing according to the fifth embodiment.
Figure 17B:
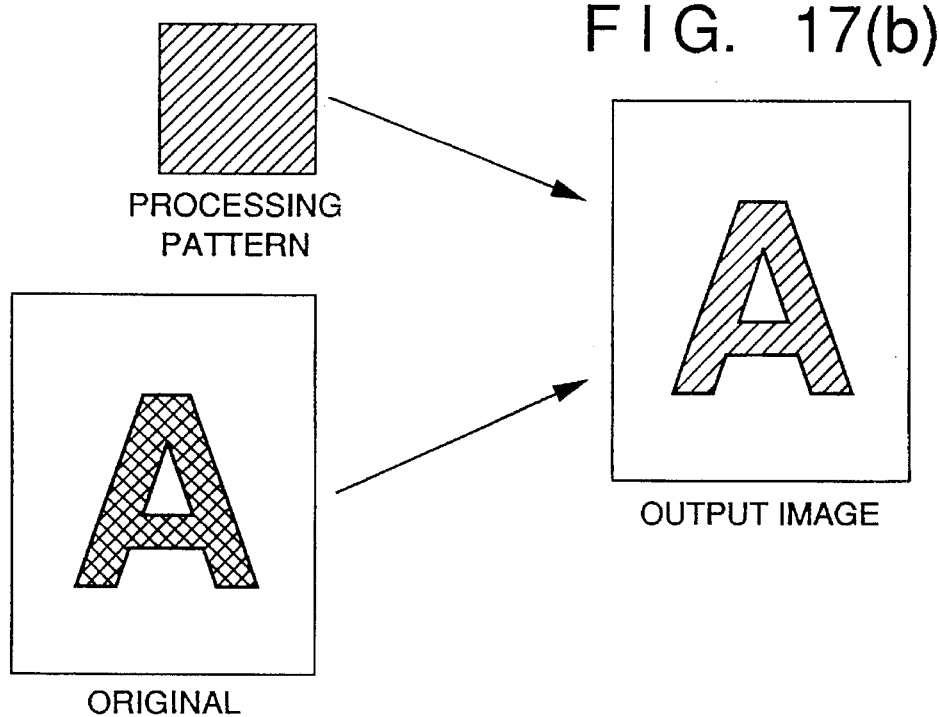
Figure 17C:
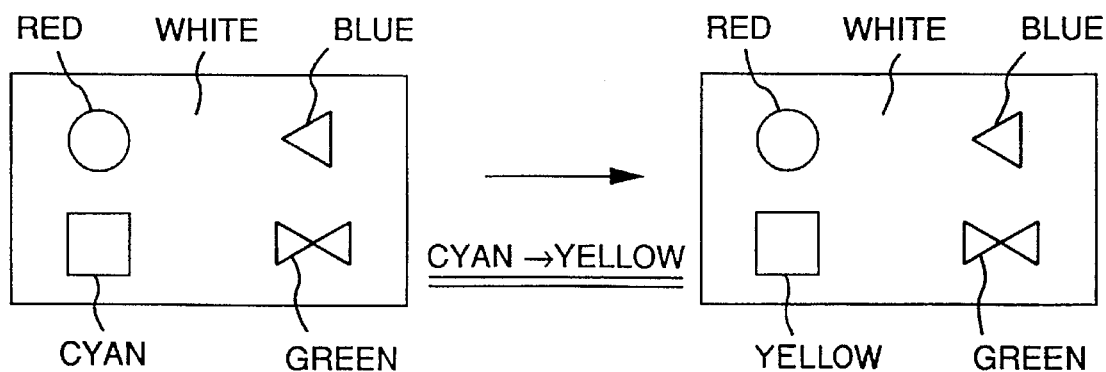

The edit processing 109 shown in FIG. 8 includes MTF processing (edge emphasizing or smoothing processing), trimming processing (for forcibly converting each pixel signal other than a designated region into a signal of "white") shown in FIG. 17(*a*), texture processing (for executing, for an original, addition/subtraction or multiplication of a signal of a processing pattern stored beforehand in a memory, thereby obtaining an output image) shown in FIG. 11(b), and color conversion processing (for converting a given color in an original image into another color) shown in FIG. 17(c). In the fifth embodiment, the color conversion processing is performed by the block 109-a in FIG. 8, and the other processing operations are performed by the block 109-b in FIG. 8. In other words, the fifth embodiment can perform edit processing with high quality because the processing is performed before encryption.

Note that the edit processing can also be performed after encryption.

If the edit processing is performed after an image signal is encrypted, the original image signal cannot be restored. In this case, therefore, the encrypted signal is decrypted first, and then edit processing is performed.

In the fifth embodiment, the memory area designation data of the LUTs shown in FIGS. 11(a) and 12 are used as the encryption method data, but the present invention is not limited to this embodiment. That is, any signal including those of the other embodiments can be used as long as the signal is for decrypting an encrypted signal.

The present invention is not limited to a color copying machine but can be applied to any system where signals are transmitted/received between image processing apparatuses, for example, between an image reading apparatus, such as a scanner or a camera, and an image storage apparatus, and between an image storage apparatus and an image forming apparatus, such as a printer or a CRT.

As many apparently widely different embodiments of the present invention can be made without departing from the spirit and scope thereof, it is to be understood that the invention is not limited to the specific embodiments thereof except as defined in the appended claims.

What is claimed is:

1. A color copying apparatus comprising:
   a first image processing unit comprising:
     image reading means for reading an original image and converting the read image into an image signal, and
     encrypting means for encrypting the image signal on the basis of information concerning encryption;
   a second image processing unit comprising:
     decrypting means for decrypting the encrypted signal from said encrypting means on the basis of the information concerning encryption, and
     image forming means for forming at least one image based on a signal from said decrypting means; and
   instructing means for instructing a coupled start of activation of said image reading means and said image forming means and communication of the information concerning encryption between said first image processing means and said second image processing means.

2. A color copying apparatus comprising:
   a first image processing unit comprising:
     color image reading means for reading an original image frame-sequentially for a plural number of color developing agents for different colors and for converting the read image into a color image signal, and
     encrypting means for encrypting the color image signal on the basis of information concerning encryption; and
   a second image processing unit comprising:
     decrypting means for decrypting the encrypted signal from said encrypting means on the basis of the information concerning encryption, and
     color image forming means for forming a color image frame-sequentially according to the color developing agents for different colors on the basis of a color image signal from said decrypting means,
   wherein the information concerning encryption is transmitted between said first image processing unit and said second image processing unit in accordance with the frame-sequential reading of said color image reading means.

3. The color image forming apparatus according to claim 2, wherein said encryption means utilizes a look-up table.

4. The color image forming apparatus according to claim 2, wherein said encryption instruction is determined by random numbers.

5. The color image forming apparatus according to claim 2, wherein said first image processing unit comprises a color image reading apparatus.

6. The color image forming apparatus according to claim 2, wherein said second image processing unit comprises a color image forming apparatus.

7. The color image forming apparatus according to claim 2, wherein said color developing agents correspond to yellow, magenta and cyan.

8. A color image processing apparatus comprising:
   a first image processing unit comprising:
     color image reading means for reading an original image and for converting the read image into a color image signal, and
     encrypting means for encrypting the color image signal on the basis of an encryption instruction;
   a second image processing unit comprising:
     decrypting means for decrypting the encrypted signal from said encrypting means on the basis of the encryption instruction, and
     signal processing means for performing a predetermined image processing on a signal from said decrypting means based on the encryption instruction;
   control means, in said first and second image processing units, for substantially deactivating operation of said encrypting means and said decrypting means; and
   detecting means for detecting disconnection of said first and second image processing units,
   wherein said control means activates said decrypting means when said detecting means detects that said first and second image processing units are disconnected.

9. The color Image processing apparatus according to claim 8, wherein said control means further comprises a display means for indicating the state of said control means.

10. The color image processing apparatus according to claim 8, wherein said encryption means utilizes a look-up table.

11. The color image forming apparatus according to claim 8, wherein said encryption instruction is determined by random numbers.

12. The color image forming apparatus according to claim 8 wherein said first image processing unit comprises a color image reading apparatus.

13. The color image forming apparatus according to claim 8, wherein said second image processing unit comprises a color image forming apparatus.

14. A color image reading apparatus for a copying apparatus connected to an external image processing apparatus, said color image reading apparatus comprising:
   original reading means for reading a color image from an original and for converting the color image read by said original reading means into a color image signal;

encrypting means for encrypting the color image signal converted by said original reading means in accordance with data about an encryption method; and communicating means for communicating the color image signal encrypted by said encrypting means and the data about the encryption method between said color image reading apparatus and the external image processing apparatus, said communicating means communicating the data about the encryption method at a timing corresponding to a start-reading instruction.

15. The color image reading apparatus according to claim 14, wherein the external image processing apparatus comprises an image storing apparatus.

16. The color image reading apparatus according to claim 14, wherein the copying apparatus generates the data about the encryption method.

17. The color image reading apparatus according to claim 14, wherein said encrypting means comprises a look-up table.

18. The color image reading apparatus according to claim 14, wherein the external image processing apparatus transmits the start-reading instruction to the copying apparatus.

19. A color image forming apparatus for a copying apparatus connected to an external image processing apparatus, said color image forming apparatus comprising:

communicating means for communicating an encrypted color image signal and data about an encryption method between said color image forming apparatus and the external image processing apparatus, said communicating means communicating the data about the encryption method at a timing corresponding to an image forming instruction;

decrypting means for decrypting the encrypted color image signal received from said communicating means; and image forming means for forming an image based on the encrypted color image signal decrypted by said decrypting means.

20. The color image forming apparatus according to claim 19, wherein the external image processing apparatus comprises an image storing apparatus.

21. The color image forming apparatus according to claim 19, wherein the external image processing apparatus generates the data about the encryption method.

22. The color image forming apparatus according to claim 19, wherein said encrypting means comprises a look-up table.

23. The color image forming apparatus according to claim 19, wherein the external image processing apparatus transmits the image forming instruction to the copying apparatus.

* * * * *

UNITED STATES PATENT AND TRADEMARK OFFICE
CERTIFICATE OF CORRECTION

PATENT NO. : 5,581,613
DATED : December 3, 1996
INVENTOR(S) : Nagashima et al.

It is certified that error appears in the above-indentified patent and that said Letters Patent is hereby corrected as shown below:

COLUMN 14:

```
Line 10, "image forming" should read --copying--;
Line 12, "image forming" should read --copying--;
Line 15, "image forming" should read --copying--;
Line 18, "image forming" should read --copying--;
Line 20, "image forming" should read --copying--;
Line 53, "forming" should read --processing--;
Line 56, "forming" should read --processing--; and
Line 59, "forming" should read --processing--.
```

Signed and Sealed this

Thirteenth Day of May, 1997

Attest:

BRUCE LEHMAN

Attesting Officer

Commissioner of Patents and Trademarks